United States Patent [19]

Sasa et al.

[11] Patent Number: 4,907,830
[45] Date of Patent: Mar. 13, 1990

[54] FLUID COUPLING

[75] Inventors: Takeya Sasa; Yoshikazu Kobayashi; Reichi Makishima, all of Tokyo, Japan

[73] Assignee: Nitto Kohki Co., Ltd., Tokyo, Japan

[21] Appl. No.: 268,724

[22] Filed: Nov. 8, 1988

[30] Foreign Application Priority Data

Nov. 10, 1987 [JP] Japan .................. 62-171801[U]

[51] Int. Cl.$^4$ ............................... F16L 55/00
[52] U.S. Cl. ....................... 285/91; 285/331; 285/354; 285/388; 285/903; 285/917
[58] Field of Search ............... 285/903, 917, 354, 386, 285/322, 323, 331, 348, 91

[56] References Cited

U.S. PATENT DOCUMENTS

| | | |
|---|---|---|
| 1,710,416 | 4/1927 | Goeller . |
| 1,738,216 | 12/1929 | Wallace . |
| 2,503,169 | 4/1950 | Phillips . |
| 2,611,506 | 9/1952 | Scheer ..................... 285/917 X |
| 2,731,058 | 1/1956 | Smisko . |
| 2,961,630 | 11/1960 | Duncan . |
| 3,425,026 | 1/1969 | Theunissen . |
| 3,488,073 | 1/1970 | Wold ..................... 285/388 |
| 3,635,501 | 1/1972 | Thorne-Thomsen . |
| 3,649,052 | 3/1972 | Snyder, Jr. . |
| 3,871,691 | 3/1975 | Takagi et al. . |
| 3,934,902 | 1/1976 | McNamee . |
| 3,992,043 | 11/1976 | Whitley ..................... 285/354 X |
| 4,014,467 | 3/1977 | Ferguson . |
| 4,423,891 | 1/1984 | Menges ..................... 285/903 X |
| 4,437,691 | 3/1984 | Laney . |
| 4,630,850 | 12/1986 | Saka ..................... 285/903 X |
| 4,674,775 | 6/1987 | Tajima et al. ..................... 285/903 X |
| 4,811,976 | 3/1989 | Yagisawa ..................... 285/917 X |

FOREIGN PATENT DOCUMENTS

| | | |
|---|---|---|
| 222051 | 1/1987 | European Pat. Off. . |
| 2110550 | 9/1972 | Fed. Rep. of Germany . |
| 2624521 | 9/1976 | Fed. Rep. of Germany . |
| 1101782 | 4/1955 | France . |
| 1146672 | 5/1957 | France . |
| 9-13915 | 7/1934 | Japan . |
| 49-31783 | 12/1974 | Japan . |
| 55-50460 | 8/1980 | Japan . |
| 58-94988 | 4/1983 | Japan . |
| 62-51916 | 1/1987 | Japan . |
| 62-32290 | 5/1987 | Japan . |
| 9853 | 1/1907 | Netherlands . |
| 1371609 | 4/1974 | United Kingdom . |

Primary Examiner—Dave W. Arola
Attorney, Agent, or Firm—Nixon & Vanderhye

[57] ABSTRACT

A fluid coupling for a corrugated pipe, comprising a coupling body having an axial through hole including a pipe insertion portion and a fluid passage portion, metallic seal means arranged on the fluid passage side of the pipe insertion portion, for sealing an end portion of a corrugated pipe pressed against the same, clamp means having at least three segments arranged in the circumferential direction and adapted to tightly hold the peripheral portion of the corrugated pipe inserted in the insertion portion, and retaining means for axially and immovably retaining the clamp means so that the end portion of the corrugated pipe is pressed against the seal means, to be sealed thereby.

8 Claims, 2 Drawing Sheets

FLUID COUPLING

BACKGROUND OF THE INVENTION

1. Field of the Invention

The present invention relates to fluid couplings or fittings for connecting bellows-shaped flexible corrugated pipes.

2. Description of the Related Art

In recent years, metallic corrugated pipes have come to be used more and more as replacements for conventional steel pipes used as indoor gas piping in houses and the like, since they are flexible and thus more workable. However, since corrugated pipes have a bellows-shaped outline with top and root portions arranged alternately they are less easy to connect to each other or to pipes than are conventional steel pipes. For this reason, fluid couplings used with corrugated pipes tend to have connecting mechanisms which are complicated and therefore difficult and time-consuming to operate. As a result, there is considerable demand for the development of a fluid coupling which will permit corrugated pipes to be more easily connected to each other and to other types of pipe.

Moreover, there is demand for the elimination of the rubber gaskets which are conventionally used to seal most corrugated pipes in order to prevent gas leakage, since in the event of a fire breaking out, the rubber gaskets will most likely melted by the heat produced, thereby causing gas to leak out and further feed the fire.

SUMMARY OF THE INVENTION

The object of the present invention is to provide a fluid coupling free of the aforementioned problems, and enjoying high working efficiency, simple construction, and low manufacturing costs.

In order to achieve the above object, according to the present invention, there is provided a fluid coupling for a corrugated pipe, which comprises: coupling body having first and second end portions and an axial through hole, the through hole including a pipe insertion portion, disposed close to the first end portion through which the front end portion of a corrugated pipe is inserted, and a fluid passage portion disposed close to the second end portion; metallic seal means arranged on the fluid passage side of the pipe insertion portion for sealing an end portion of a corrugated pipe pressed against the same; clamp means having at least three segments arranged in the circumferential direction, an axial through hole defined when the segments are arranged in the circumferential direction, and an outside diameter such that at least part of the clamp means can be inserted into the pipe insertion portion, the clamp means being capable of tightly holding the peripheral portion of the corrugated pipe inserted in the axial through hole; and retaining means for axially and immovably retaining the clamp means so that the end portion of the corrugated pipe is pressed against the seal means, to be sealed thereby.

Preferably, the whole fluid coupling is made of metal.

In connecting the corrugated pipe to the fluid coupling, the axial through hole of the clamp means is spread, the corrugated pipe is passed through the through hole so that its front end inserted into the coupling body, and the clamp means is then moved toward the second end portion. Thereupon, the clamp means engages the pipe insertion portion at the first end portion of the coupling body, and is centripetally narrowed. As a result, the inner surface of the clamp means, whose internal configuration resembles the external configuration of the corrugated pipe, is engagedly pressed against the outer peripheral surface of the inserted pipe. Thus, the retaining means prevents the corrugated pipe from slipping out of the coupling body. As the clamp means moves in the aforesaid direction, moreover, the corrugated pipe, whose outer peripheral surface is engagedly pressed by the clamp means, is moved in the same direction. As a result, the front end of the corrugated pipe is sealed by the seal means inside the coupling body.

Thus, by inserting the corrugated pipe into the coupling body and moving the clamp means toward the second end portion of the body, the pipe can be connectedly fixed to the coupling body in a manner such that the clamp means is fitted in the pipe insertion portion and centripetally narrowed to be pressed against the outer peripheral root portions of the inserted pipe. Also, the front end portion of the corrugated pipe can be sealed by means of the seal means disposed inside the coupling body. Thus, the connection work is easy.

The whole fluid coupling may be made of metal, and the fluid coupling may be used to connect a metallic corrugated pipe for gas supply whose front end portion is metal-sealed. In case of a fire, according to such an arrangement, the metal seal means can prevent or minimize gas leakage from the corrugated pipe. Accordingly, an accident due to a gas leak can be prevented. Thus, the fluid coupling according to the present invention can be very conveniently used for the connection of a corrugated pipe, especially one for use as an indoor gas pipe. Since the fluid coupling has a simple construction, moreover, it can be easily manufactured at low cost.

DETAILED DESCRIPTION OF THE PREFERRED EMBODIMENTS

Figure 1:
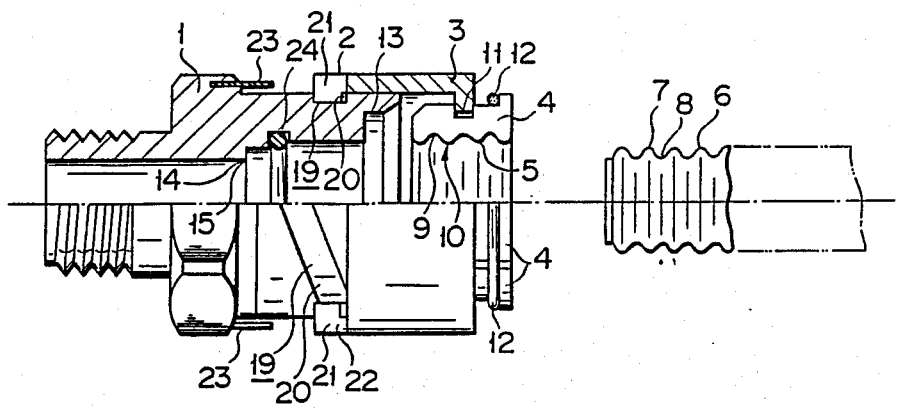
FIG. 1 is a partial longitudinal sectional view of a fluid coupling according to an embodiment of the present invention.
Figure 2:
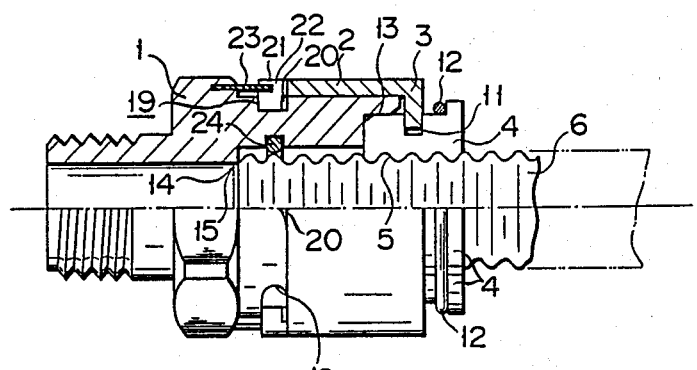
FIG. 2 is an enlarged perspective view of a chuck.

Although preferred embodiments of the present invention will now be described in detail with reference to the accompanying drawings, it is to be understood that the invention is not limited to those precise embodiments.

In these drawings, numeral 1 designates a cylindrical coupling body which, preferably made of metal, constitutes a fluid coupling. Body 1 has an axial through hole which includes a pipe insertion portion on the right-hand side of FIG. 1 and a fluid passage portion on the left-hand side. The right-hand part of the insertion portion includes an enlarged portion, which opens to the end face of body 1 and can house clamp means mentioned later. Cylindrical body 1 has a cylindrical outer peripheral surface on its front or right-hand end side. A male thread, which can threadedly engage an ordinary gas pipe or the like, is formed at the opposite end portion of body 1. Numeral 2 designates a sleeve, for use as retaining means, which is fitted on cylindrical body 1 for axial movement. A projection or collar portion 3 protrudes radially inward from the inner peripheral surface of the front end of sleeve 2. Numeral 4 designates a ring-shaped chuck, for use as the clamp means, which, including a plurality of segments, is supported by the inner peripheral surface of the front end of sleeve 2. The internal profile of inner surface 5 of chuck 4 has root portions 9 and top portions 10, which resemble top portions 7 and root portions 8 of the external profile of metallic corrugated pipe 6, e.g., a gas pipe, connected to cylindrical body 1. Chuck 4 is circumferentially divided into at least three segments. Circumferential groove portion 11 is formed on the outer peripheral surface of chuck 4. Chuck 4 is contractibly supported by the inner peripheral surface of the front end of sleeve 2 in a manner such that collar portion 3 of the sleeve engages groove portion 11 with a radial gap between them. Centrifugal expansion of chuck 4 serves at least to allow the passage of corrugated pipe 6 through the chuck. Centripetal contraction of chuck 4, on the other hand, causes root portions 9 and top portions 10 of inner surface 5 of the chuck to engage and press top portions 7 and root portions 8 on the outer peripheral surface of pipe 6 inside the chuck. Numeral 12 designates a ring of e.g. rubber or spring which is fitted on the outer peripheral surface of chuck 4, thus annularly holding the chuck. The enlarged portion of the pipe insertion portion, which opens to the front end portion of cylindrical body 1, constitutes chuck holding portion 13. Holding portion 13, which is supported by sleeve 2, receives ring-shaped chuck 4 which moves toward the rear end side as the sleeve moves in the same direction. Thus, the holding portion centripetally narrows chuck 4 so that the chuck is pressed against the outer peripheral surface of corrugated pipe 6 inserted therein. The open end face of chuck holding portion 13 and the open end face of chuck 4 opposed thereto are tapered so as to be able to guide the spread chuck in the axial direction, in order to facilitate the fitting of the chuck into the holding portion.

If corrugated pipe 6 is inserted through ring-shaped chuck 4 into cylindrical body 1 to move sleeve 2 rearward, chuck 4 moves in the same direction to be fitted into chuck holding portion 13 at the front end portion of body 1. As a result, chuck 4 is centripetally narrowed so that root portions 9 and top portions 10 of inner surface 5 of the chuck are engagedly pressed against top portions 7 and root portions 8 of corrugated pipe 6. Thus, pipe 6 is prevented from slipping out of body 1. The movement of chuck 4 in holding portion 13 causes pipe 6 to advance in the same direction while chuck 4 is pressed against pipe 6.

Numeral 14 designates seal means or a metal seal portion which is disposed inside cylindrical body 1. Seal portion 14 is pressed, for sealing, against the front end portion of corrugated pipe 6 which, having its outer peripheral surface pressed by the movement of chuck 4, advances in the same direction as body 6. The sealing of the front end portion of pipe 6 is not limited to this method, and any of the end face and the outer and inner surfaces of the front end portion of pipe 6 may be sealed.

Figure 3:
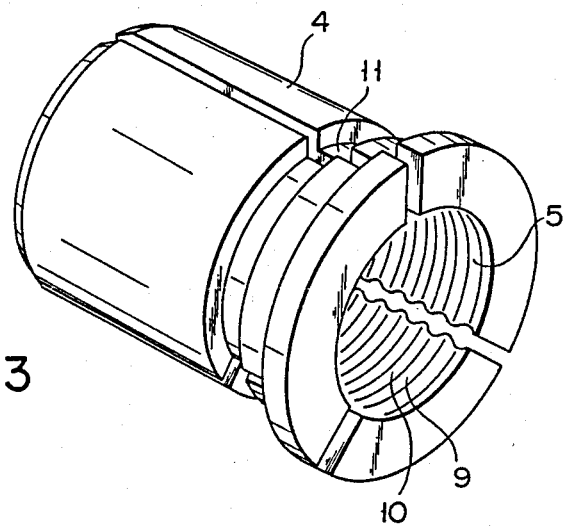
FIG. 3 is a partial longitudinal sectional view showing an arrangement in which a corrugated pipe is connectedly fixed to the fluid coupling shown in FIG. 1 and sealed.

In the embodiment shown in FIGS. 1 and 3, the end face of the front end portion of corrugated pipe 6 is sealed. Metal seal portion 14 is formed of annular surface or step portion 15 on the inner peripheral surface of cylindrical body 1. The end face of the front end portion of advanced pipe 6 is pressed against seal portion 14 or step portion 15 to effect sealing.

Figure 4:
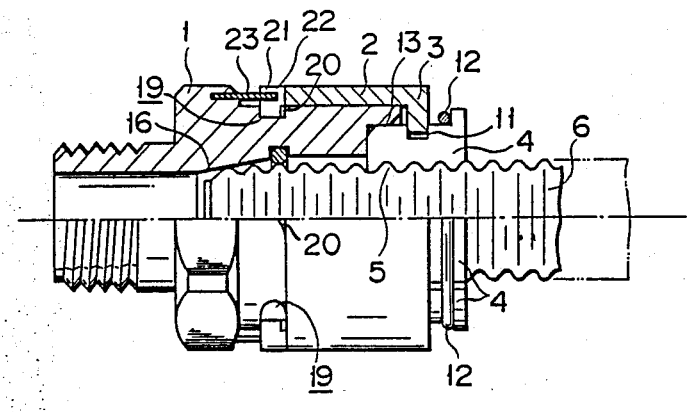
FIGS. 4 and 5 are partial longitudinal sectional views showing alternative embodiments.

In an embodiment shown in FIG. 4, the outer surface of the front end portion of corrugated pipe 6 is sealed. Metal seal portion 14 includes taper surface 16 which is formed on the inner peripheral surface of cylindrical body 1 so as to be gradually reduced in diameter toward the rear end. The front end portion of advanced pipe 6 is inserted into seal portion 14 or taper surface 16 so that its outer surface is pressed against surface 16 to effect sealing.

Figure 5:
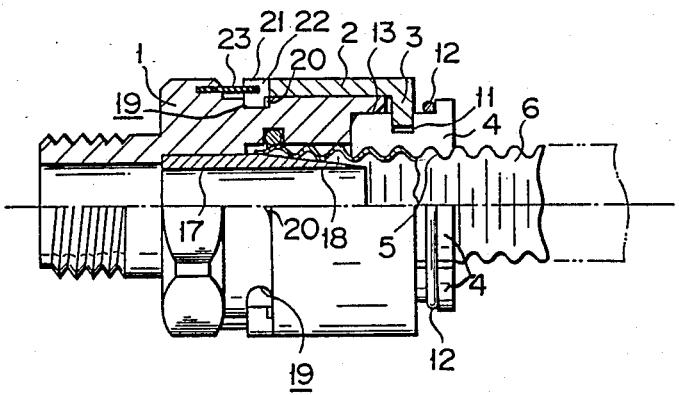

In an embodiment shown in FIG. 5, the inner surface of the front end portion of corrugated pipe 6 is sealed. Metal seal portion 14 is formed of a generally cylindrical seal member 17 inserted in cylindrical body 1. Seal member 17 is adapted to be fitted in inserted corrugated pipe 6. The outer peripheral surface of the fitting portion of member 17 is formed of taper surface 18 which is reduced in diameter toward the front end. Seal member 17 is fitted into advanced pipe 6 so that the inner surface of the front end portion of pipe 6 is pressed against gradually spreading taper surface 18 of member 17 to effect sealing.

The fluid coupling according to the above embodiment is provided with fixing mechanism 19 for fixing sleeve 2 which is moved to the rear end side in order to connectedly fix and seal corrugated pipe 6. In this embodiment, mechanism 19 includes spiral guide groove 20 on the outer peripheral surface of cylindrical body 1, engaging pin 21 on sleeve 2 adapted to engage groove 20, engaging portion 22 axially protruding from or bored in the rear end of sleeve 2, and stopper 23 on body 1. Engaging pin 21 causes sleeve 2 to move in the axial direction while rotating on cylindrical body 1. Engaging portion 22, which has an engaging surface on its leading side of rotation, rotates as sleeve 2 moves to the front end side. Stopper 23 is adapted to engage portion 22 when sleeve 2 is retreated to its full-back position, that is, when the connection or fixing and sealing of corrugated pipe 6 is finished. Before engaging the engaging portion, stopper 23, which is formed of a resilient material, runs on the rear end portion of sleeve 2 moved to the rear end side by rotation. After the engagement, sleeve 2 is prevented from rotating to move to the front end side, and is securely fixed in position. In this embodiment, guide groove 20 and engaging pin 21 are formed on the outer peripheral surface of cylindrical body 1 and sleeve 2, respectively. Alternatively, however, a guide groove and an engaging pin may be provided on sleeve 2 and the outer peripheral surface of body 1, respectively. Numeral 24 designates a rubber gasket.

What is claimed is:

1. A fluid coupling for a corrugated pipe, comprising: clamp means having at least one end portion and a coupling body having first and second end portions and an axial through hole, said through hole including a pipe insertion portion, disposed close to the first end portion through which the front end portion of a corrugated pipe is inserted, and a fluid passage portion disposed close to the second end portion; wherein said pipe insertion portion includes a large-diameter portion opening to the one end portion side and housing said at least one end portion of said clamp means, said clamp means includes at least three segments and each of said segments of said clamp means has an inner surface defining the axial through hole, said inner surface having a configuration such as to be able to mate with the external configuration of the corrugated pipe when the clamp means is inserted in the large-diameter portion;

metallic seal means arranged on the fluid passage side the pipe insertion portion, for sealing an end portion of a corrugated pipe pressure against the same;

said at least three segments arranged in the circumferential direction, an axial through hole defined when the segments are arranged in the circumferential direction, and an outside diameter at said at least one end portion such that at least part of the clamp means can be inserted into said large-diameter portion, said clamp means being capable of tightly holding the peripheral portion of the corrugated pipe inserted in the axial through hole; and retaining means for axially and immovably retaining the clamp means so that the end portion of the corrugated pipe is pressed against the seal means, to be sealed thereby, and wherein said coupling body has a cylindrical outer peripheral surface on the side of the first end portion thereof, said clamp means has a groove formed on the outer peripheral surface of each of the segments, said groove becoming circumferentially continuous when the segments are assembled into a cylindrical configuration, and said retaining means includes a sleeve having first and second end portions and which is slidable on the outer peripheral surface of the coupling body, said first end portion having a projection protruding radially inward therefrom and adapted to be fitted in the circumferential groove of the clamp means.

2. The fluid coupling according to claim 1, wherein a radial gap is left between the circumferential groove of said clamp means, formed by assembly the individual segments, and the projection of said sleeve.

3. The fluid coupling according to claim 2, wherein the length of said radial gap is substantially equal to half the difference in diameter between top portions and root portions of the corrugated pipe.

4. The fluid coupling according to claim 3, wherein said coupling body and retaining means includes a spiral guide groove, formed on the outer peripheral surface thereof, and a stopper for preventing the sleeve from rotating when the end portion of the corrugated pipe is sealed by the seal means, and said sleeve has a pin member guided by the guide groove and a recess adapted to engage the stopper, at the second end portion thereof.

5. The fluid coupling according to claim 4, wherein said coupling body, clamp means, and sleeve are made of metal.

6. The fluid coupling according to claim 5, wherein said seal means includes an annular surface adapted to be pressed and sealed by at least one of the end face of the corrugated pipe and the side face of that top portion of the pipe adjacent to the end face, between the pipe insertion portion and the fluid passage portion.

7. The fluid coupling according to claim 5, wherein said seal means includes a taper surface converging toward the second end portion of the coupling body and adapted to be pressed and sealed by the outer peripheral surface of the corrugated pipe, on the fluid-passage side of the pipe insertion portion.

8. The fluid coupling according to claim 5, wherein said seal means includes a seal member projecting from the fluid passage portion into the pipe insertion portion and having one end capable of being inserted into the end portion of the corrugated pipe in the coupling body, said seal member having, on the outer peripheral surface thereof, a tapered seal surface converging toward said one end.

* * * * *